Figure 1:
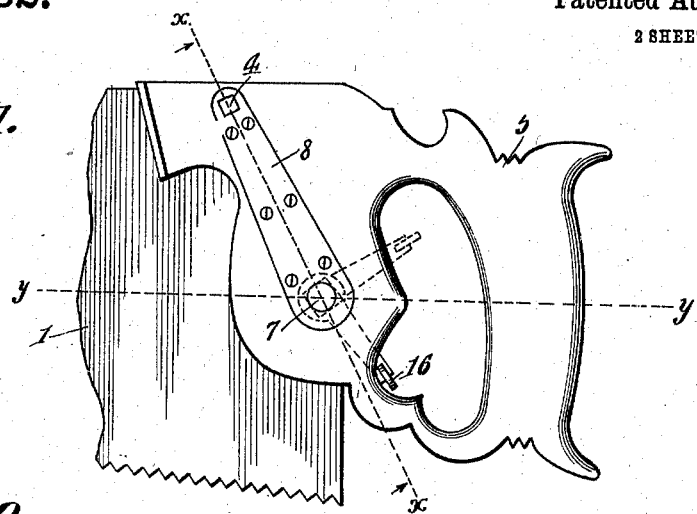

A. M. LEONARD & A. F. KLEE.
CARPENTER'S SAW.
APPLICATION FILED FEB. 19, 1909. RENEWED MAY 24, 1910.

966,932.

Patented Aug. 9, 1910.
2 SHEETS—SHEET 1.

Witnesses
William Linton.
V. B. Hillyard.

Inventors
Andy F. Klee and
Allen M. Leonard.
By Victor J. Evans
Attorney

A. M. LEONARD & A. F. KLEE.
CARPENTER'S SAW.
APPLICATION FILED FEB. 19, 1909. RENEWED MAY 24, 1910.

966,932.

Patented Aug. 9, 1910.
2 SHEETS—SHEET 2.

Witnesses
William C. Linton.
V. B. Hillyard.

Inventors
Andy F. Klee and
Allen M. Leonard.
By Victor J. Evans
Attorney

UNITED STATES PATENT OFFICE.

ALLEN M. LEONARD AND ANDY F. KLEE, OF EAST LAKE, ALABAMA.

CARPENTER'S SAW.

966,932. Specification of Letters Patent. Patented Aug. 9, 1910.

Application filed February 19, 1909, Serial No. 478,848. Renewed May 24, 1910. Serial No. 563,155.

*To all whom it may concern:*

Be it known that we, ALLEN M. LEONARD and ANDY F. KLEE, citizens of the United States, residing at East Lake, in the county of Jefferson and State of Alabama, have invented new and useful Improvements in Carpenters' Saws, of which the following is a specification.

A carpenter's kit of tools usually embodies a plurality of hand saws of different degrees of fineness and these saws generally occupy considerable space because of their length and the thickness of the handles.

The purpose of the invention is to provide a handle which may be readily fitted to any number of saw blades with the result that the tools may be packed into a small space since the saw blades may be placed close together and the handle detached and stored. This construction results in materially reducing the length of the package.

The invention consists chiefly in the peculiar construction of fastening means coöperating with the handle and saw blade whereby the handle may be easily and quickly removed from the blade or attached thereto and when in position is firm and secure against displacement or any looseness.

The invention further consists in the novel features, details of construction and combinations of parts which hereinafter will be more particularly set forth, illustrated in the drawings hereto attached and pointed out in the appended claims.

Figure 2:
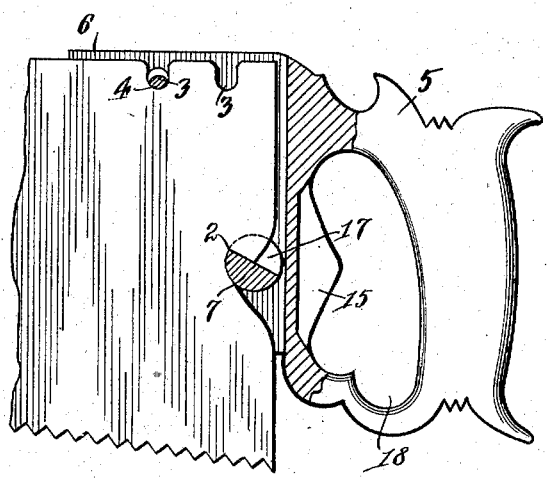
Figure 3:
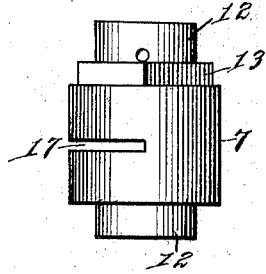
Figure 4:
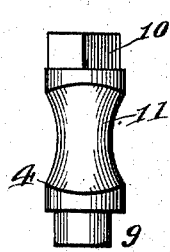
Figure 5:
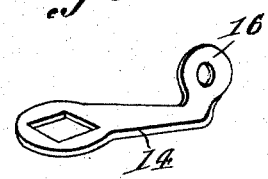
Figure 6:
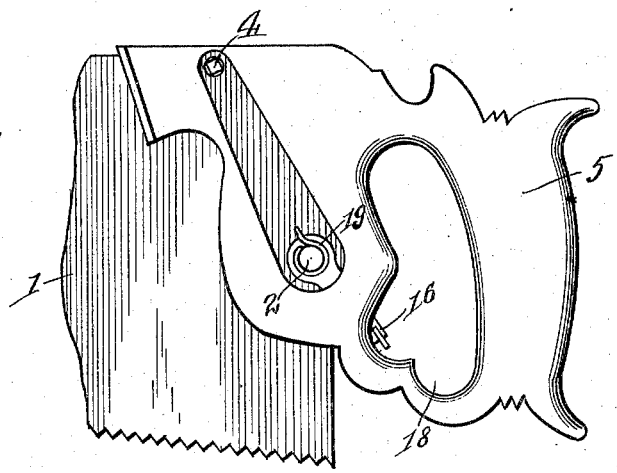
Figure 7:
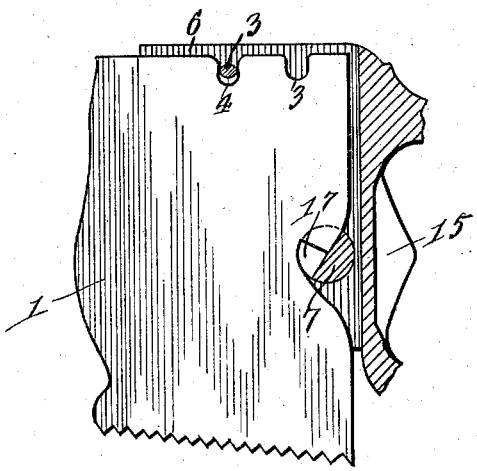
Figure 8:
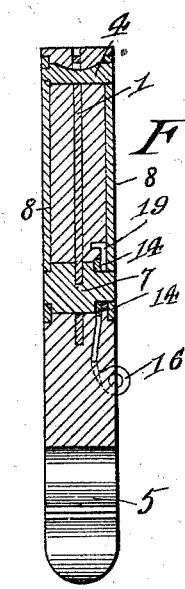
Figure 9:
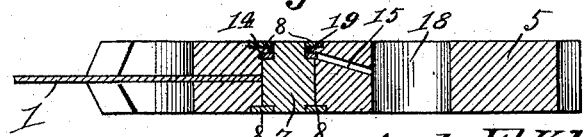

In the accompanying drawings:—Figure 1 is a side view of a saw handle and end portion of a saw blade embodying the invention. Fig. 2 is a view similar to Fig. 1, a portion of the saw handle being broken away and the fastening studs being in section. Fig. 3 is a detail view of the rotary fastening stud. Fig. 4 is a detail view of the relatively fixed fastening stud. Fig. 5 is a detail perspective view of the lever for operating the rotary fastening stud. Fig. 6 is a view similar to Fig. 1 with the side plate removed. Fig. 7 is a detail view showing the front portion of the handle in section, the latter being taken in a plane view of the kerf. Fig. 8 is a section on the line $x$—$x$ of Fig. 1 looking in the direction of the arrows. Fig. 9 is a section on the line $y$—$y$ of Fig. 1.

Corresponding and like parts are referred to in the following description and indicated in all the views of the drawings by the same reference characters.

The saw blade 1 may be of the usual form and is provided in its rear end with a notch 2 of substantially V-form the entrance to the notch being flared to form a mouth for directing the blade into position when assembling the parts. A series of notches 3 are provided in the back of the saw blade near the rear end and are adapted to receive the relatively fixed fastening stud 4. By providing a series of notches 3, it is possible to adjust the inclination of the saw blade to the handle which may be of advantage under certain conditions. Within the spirit of the invention, it is not necessary to provide more than one notch 3, the same occupying a given position so that the handle and saw blade always occupy a fixed relative position when assembled.

The saw handle 5 may be of usual construction and is provided in its forward end with a kerf 6 to receive the rear end of the saw blade in the accustomed manner. The fastening studs 4 and 7 intersect the kerf 6 and engage with the notches 3 and 2 of the saw blade and retain the latter in place. The fastening studs are supported at their ends in the portions of the handle 5 upon opposite sides of the kerf 6. It is to be remembered that saw handles are generally formed of wood and in order to prevent the end portions of the fastening stud wearing away the handle and enlarging the openings, fitted plates 8 are applied to opposite sides of the saw handles and are let into recesses formed therein so as to come flush with the sides of the saw handle. These plates may be secured to the handle by screws or other fastenings thereby admitting of the plates being removed when required. The fastening stud 4 is relatively fixed in juxtaposition to the fastening stud 7 which is mounted for rotation. The terminal portions of the stud 4 are reduced, one of the reduced ends being made rounding as indicated at 9 and the opposite end being of square or angular formation as indicated at 10. The intermediate portion of the stud is made hollow as indicated at 11 forming in effect a cam portion so as to vary the relative distance between the engaging portions of the studs 4 and 7 when the saw blade is made secure. One of the plates 8 has the opening made rounding to receive the journal 9 of the fastening stud 4 and the opposite plate has the opening to receive the angular end of the stud of corresponding form so as to fix the position of the stud when adjusted.

The rotary fastening stud 7 is provided at opposite ends with reduced portions forming journals or trunnions 12 which obtain bearings in openings formed in the plates 8. A portion of the stud 7 adjacent to one of the journals is made square or of angular form as indicated at 13 and is adapted to receive the ends of a lever 14 which is fitted thereon. The lever 14 operates in a slot 15 formed in the rear edge of the front portion of the saw handle. The outer end of the lever 14 is deflected laterally as indicated at 16 to provide a finger piece for convenience of operating the lever when it is required either to release or secure the saw blade. A slot 17 is formed in the side of the stud 7 and extends about half way therethrough and approximately at a right angle to the axis of the stud. The slot 17 is designed to receive the projecting portion of the saw blade bordering upon the notch 2 as indicated most clearly in Fig. 2. When the parts are assembled, an end portion of the fastening stud 7 bordering upon the slot 17 enters the notch 2 and in conjunction with the stud 4 entering a notch 3, secures the handle and saw blade when placed together.
The saw handle is provided with the usual opening 18 to receive the hand and by arranging the lever 14 so that the projecting portion operates in the opening 18, said lever is entirely out of the way and does not present any projecting parts which would interfere with the close packing of the handle or be liable to be struck by a piece of timber or other work and loosen the handle when the saw is in operation.
When the outer end of the lever 14 is thrown upward, the slot 71 of the rotary stud 7 faces the front end of the saw handle, thereby admitting of the saw blade being either placed in position or removed from the handle. When the saw blade is fitted to the saw handle with the notch 3 receiving the fastening stud 4 and the notch 2 in position to receive an end portion of the rotary fastening stud bordering upon the slot 17, thereof, the outer end of the lever 14 is pressed downward thereby turning the stud 7 and causing the end portion thereof adjacent the slot 17 to enter the notch 2 and secure the blade as indicated most clearly in Fig. 2. The spring 19 is provided and coöperates with the lever 14 to hold its outer end depressed and thereby prevent casual disengagement of the stud 7 from the saw blade when the parts are in position.
It will be understood from the foregoing that the invention enables one handle to be used in connection with a number of saw blades with the result that a series of hand saws may be packed in a small space both with reference to width and length and, moreover, the cost is materially reduced since it is necessary only to provide a single handle for a number of saw blades. Moreover, the construction is such as to enable the saw blade to be inclined with reference to the handle should occasion require or the nature of the work render the same desirable.

We claim:—

1. In combination, a saw blade provided in its back with a notch and having another notch in its rear end, a saw handle having a kerf to receive the rear end of the saw blade, a rotary fastening stud mounted in the saw handle and adapted to engage one of the notches of the saw blade, and a second fastening stud mounted in the saw handle and having an intermediate portion of cam form to enter the other notch of the saw blade and secure the same, said fastening stud being adjustable and adapted to be secured in the adjusted position thereby varying the distance between the gripping portions of the coöperating fastening studs to insure a firm fastening of the handle and saw blade.

2. In combination, a saw blade provided in its back and rear end with notches, a saw handle having a kerf to receive the rear end of the saw blade, a fastening stud mounted in the saw handle and adapted to engage the notch in the back of the saw blade, a rotary fastening stud mounted in the saw handle and having a slot intermediate its ends to register with the kerf in the saw handle and adapted to receive a portion of the saw blade bordering upon the notch in the rear end thereof, and a lever attached to the rotary stud for operating the same.

3. In combination, a saw blade provided in its back and rear end with notches, and the saw handle having a kerf to receive the rear end of the saw blade and provided with the usual hand opening and having a slot in the front portion leading into said hand opening, studs mounted in the handle and adapted to engage the notches of the saw blade, one of the studs being rotatable, and a lever connected with the rotatable stud and operating in the slot formed in the front portion of the handle, and having a finger piece extended into the hand opening of the saw handle.

4. In combination, a saw blade provided in its back and rear end with notches, a saw handle having a kerf to receive the rear end of the saw blade, plates fitted to opposite sides of the saw handle, fastening studs intersecting the kerf of the handle and having their ends mounted in said plates, one of the studs having an angular portion fitted into an angular opening provided in one of said plates to hold said stud in fixed position, and the other stud having a cam portion to engage the notch in the back of the saw blade and rotatably mounted, and a lever connected with said rotatably mounted stud.

In testimony whereof we affix our signatures in presence of two witnesses.

ALLEN M. LEONARD.
ANDY F. KLEE.

Witnesses:
 INEZ B. ALDEN,
 W. T. UNDERWOOD, Jr.